(12) United States Patent
Carnevali

(10) Patent No.: US 7,017,243 B2
(45) Date of Patent: Mar. 28, 2006

(54) SECURE INTERFACE CRADLE FOR POCKET PERSONAL COMPUTER DEVICE

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 34 days.

(21) Appl. No.: 10/636,058

(22) Filed: Aug. 7, 2003

(65) Prior Publication Data
US 2005/0028325 A1 Feb. 10, 2005

(51) Int. Cl.
*A41F 1/00* (2006.01)
(52) U.S. Cl. .............. 24/523; 24/3.1; 24/3.7; 248/309.1
(58) Field of Classification Search .......... 24/3.1, 24/3.7, 3.8, 3.11, 3.12, 522, 523; 248/297.11, 248/297.31, 316.1, 316.4, 188.5, 313, 309.1, 248/314; 269/156, 165, 254 CS, 254 R; 379/426, 446, 454, 455; 224/242, 245, 662
See application file for complete search history.

(56) References Cited

U.S. PATENT DOCUMENTS

| | | | | |
|---|---|---|---|---|
| 2,319,377 | A * | 5/1943 | Wallace et al. ............... | 24/523 |
| 3,509,882 | A * | 5/1970 | Blake ........................... | 24/523 |
| 4,803,759 | A * | 2/1989 | Kemble ........................ | 24/523 |
| 4,928,916 | A * | 5/1990 | Molloy ...................... | 248/354.1 |
| 4,976,721 | A * | 12/1990 | Blasnik et al. ................ | 24/523 |
| 5,457,745 | A | 10/1995 | Wang | |
| 5,582,377 | A * | 12/1996 | Quesada ....................... | 24/523 |
| D377,798 | S | 2/1997 | Heine | |
| 5,845,885 | A * | 12/1998 | Carnevali ................ | 248/181.1 |
| 5,903,645 | A * | 5/1999 | Tsay ........................... | 379/455 |
| 5,917,907 | A * | 6/1999 | Kela .......................... | 379/446 |
| 6,032,337 | A * | 3/2000 | Rankin et al. .............. | 24/3.12 |
| 6,095,470 | A | 8/2000 | Kalis | |
| 6,173,933 | B1 | 1/2001 | Whiteside et al. | |
| 6,229,893 | B1 * | 5/2001 | Chen .......................... | 379/454 |
| 6,260,866 | B1 * | 7/2001 | Cheng ..................... | 280/87.05 |
| 6,370,741 | B1 * | 4/2002 | Lu ............................. | 24/523 |
| 6,427,959 | B1 * | 8/2002 | Kalis et al. ............ | 248/288.11 |
| 6,600,827 | B1 * | 7/2003 | Lu .............................. | 381/388 |
| 6,647,248 | B1 * | 11/2003 | Ortscheid et al. ........... | 224/255 |
| 6,785,567 | B1 * | 8/2004 | Kato ..................... | 379/433.11 |
| 6,802,848 | B1 * | 10/2004 | Anderson et al. ............. | 24/523 |
| 2004/0022388 | A1 * | 2/2004 | Chan et al. ................ | 379/455 |

* cited by examiner

Primary Examiner—Robert J. Sandy
Assistant Examiner—Ruth C. Rodriguez
(74) Attorney, Agent, or Firm—Charles J. Rupnick

(57) ABSTRACT

A secure clamping mechanism formed with two spaced apart surfaces; a resiliently compressible biasing member positioned between the two spaced apart surfaces; a clamp having a drive shaft that is structured to be slidingly engaged between the two spaced apart surfaces; and an interference member for engaging the biasing member between the drive portion and at least one of the spaced apart surfaces.

23 Claims, 6 Drawing Sheets

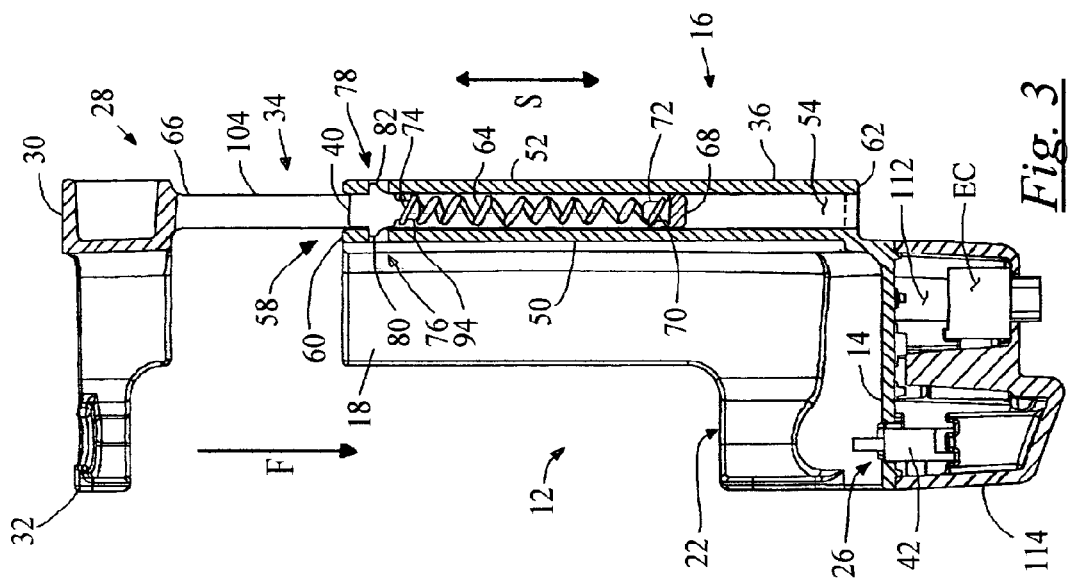
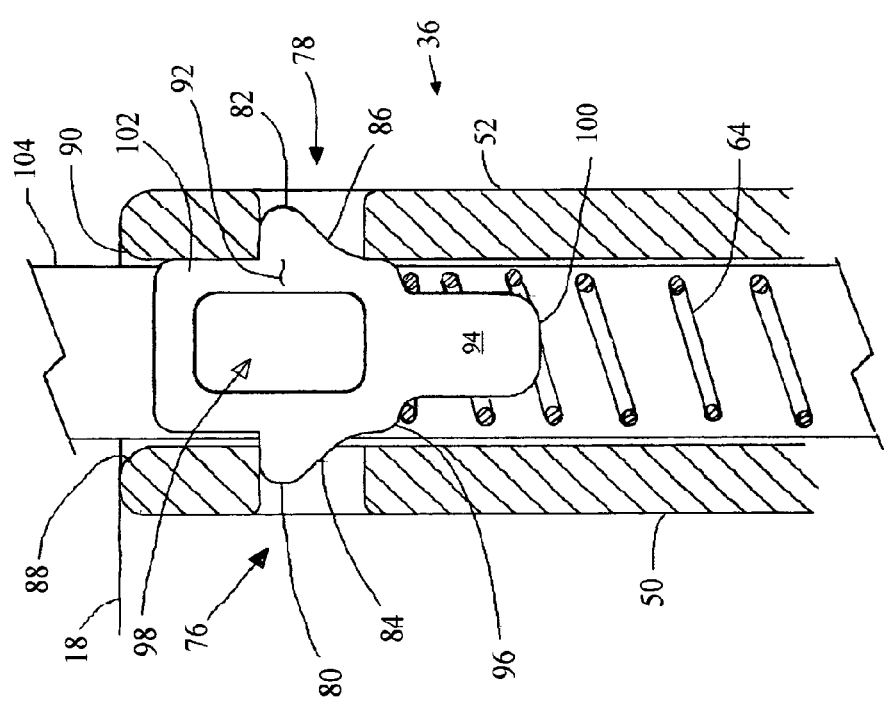

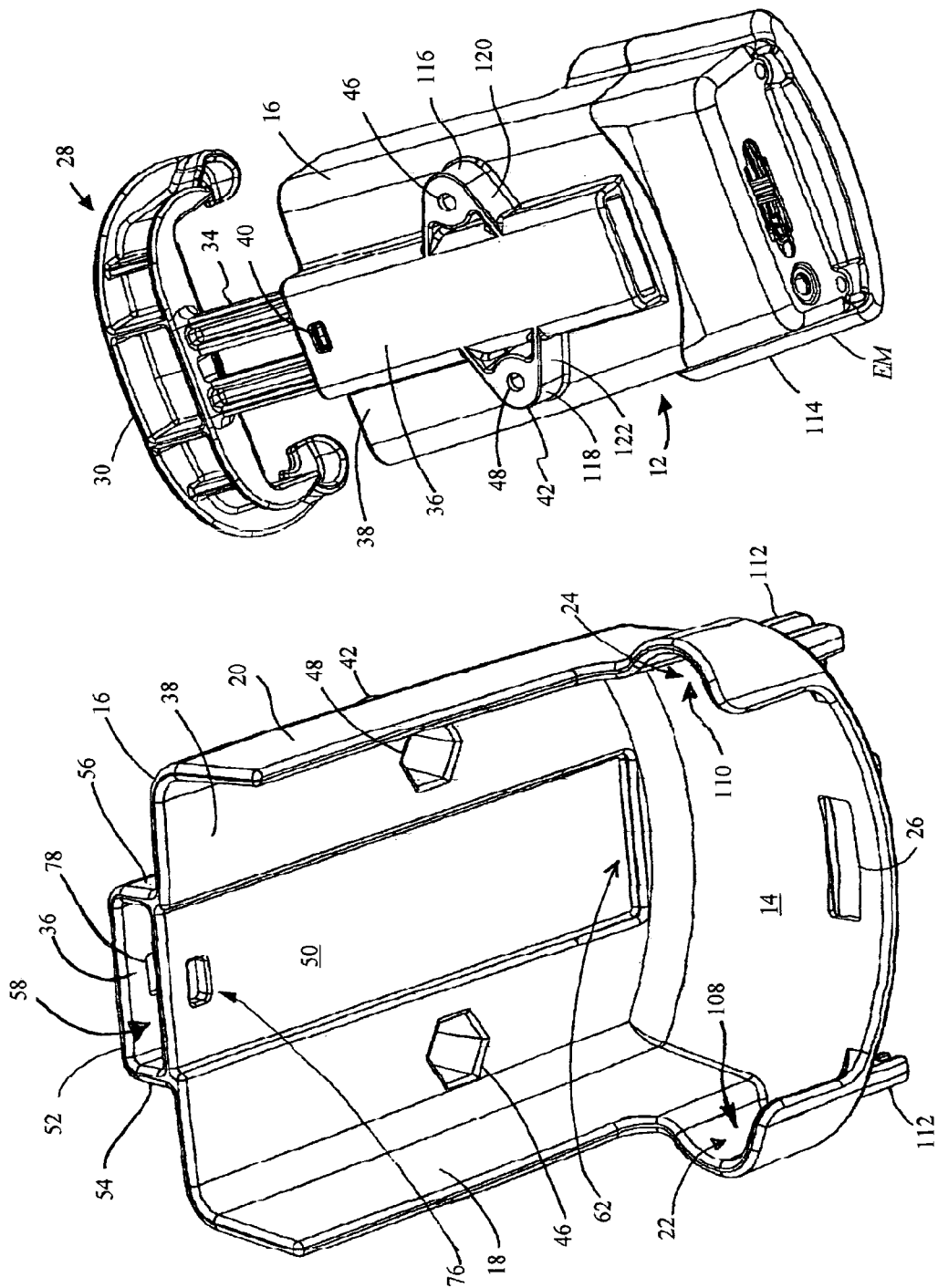

SECURE INTERFACE CRADLE FOR POCKET PERSONAL COMPUTER DEVICE

FIELD OF THE INVENTION

The present invention relates to a mounting apparatus for an electronic device, and in particular to mounting apparatuses for securely releasably cradling and electrically interfacing a pocket-sized personal computer and other mobile electronic devices.

BACKGROUND OF THE INVENTION

Mounting platforms are generally well-known for securely cradling and electrically interfacing hand-held pocket-sized personal computers, commonly referred to as "pocket PCs," and other mobile electronic devices, such as cellular telephones, mobile global positioning system (GPS) receivers, Personal Digital Accessories (PDAs) and other mobile electronic devices of the type generally illustrated in FIG. 1.

One such mounting platform is presented in U.S. Pat. No. 6,427,959, entitled MOUNTING BRACKET FOR AN ELECTRONIC DEVICE, issued Aug. 6, 2002, to Kalis, et al., which is incorporated herein by reference, which includes a cradle adapted for being releasably secured to the electronic device and also includes a support adapted for being mounted to a surface. The cradle is adapted to move along its longitudinal axis relative to an electrical connector that is slidably connected to the cradle. A user can fix the position of the cradle relative to the mounting surface by means of a pin and locking mechanism on the back of the cradle to the support.

Other mounting platforms are also currently known. However, current mounting platforms may be inefficient for effectively securely releasably cradling and electrically interfacing a pocket-sized personal computers or other mobile electronic devices.

SUMMARY OF THE INVENTION

The present invention is a combined cradle and electrical interface apparatus having a resiliently biased or "spring-loaded" clamping mechanism that overcomes known limitations for securing any hand-held or personal mobile device such as a pocket-sized personal computer, commonly referred to as a "pocket PC," and other personal mobile electronic devices, such as cellular telephones, mobile global positioning system (GPS) receivers, a Personal Digital Accessory (PDA) and other hand-held or personal mobile devices.

The spring-loaded clamping mechanism permits such a pocket PC or other hand-held or mobile device to be easily and securely mounted in an integral combined cradle and electrical interface apparatus, while permitting quick and easy removal of the device.

According to one aspect of the invention, the spring-loaded clamping mechanism includes two spaced apart surfaces; a resiliently compressible biasing member positioned between the two spaced apart surfaces; a clamp portion having a drive portion that is structured to be slidingly engaged between the two spaced apart surfaces; and an interference means for engaging the biasing member between the drive portion and at least one of the spaced apart surfaces.

According to another aspect of the invention, the interference means of the spring-loaded clamping mechanism includes means for limiting relative motion of the clamp portion between the two spaced apart surfaces.

According to another aspect of the invention, the interference means of the spring-loaded clamping mechanism includes a locking key interlocked with at least one of the two spaced apart surfaces.

According to another aspect of the invention, either the locking key or at least one of the spaced apart surfaces is structured to resiliently flex to permit the locking key to be positioned between the two spaced apart surfaces and is further structured to relax for interlocking the locking key between the two spaced apart surfaces after the locking key is positioned.

According to another aspect of the invention, the interference means of the spring-loaded clamping mechanism is a notch formed in at least one of the two spaced apart surfaces, and a locking key having a complementary detent engaged with the notch.

According to another aspect of the invention, the drive portion means of the spring-loaded clamping mechanism includes an elongated shaft that is structured to slidingly fit between the two spaced apart surfaces and that is further structured for engaging a first end of the biasing member.

According to another aspect of the invention, the clamp portion of the spring-loaded clamping mechanism includes a jaw; and the elongated shaft further comprises a shaft extended from the jaw, wherein a portion of the elongated shaft distal from the jaw is structured for engaging the first end of the biasing member.

According to another aspect of the invention, the locking key of the spring-loaded clamping mechanism includes a means for engaging a second end of the biasing member opposite from the first end thereof.

According to another aspect of the invention, the locking key of the spring-loaded clamping mechanism is structured with a substantially rigid elongated body having a substantially rectangular cross-section; a substantially rectangular shoulder portion is formed at a first end of the elongated body; and first and second detents project from opposing sides of the elongated body.

According to another aspect of the invention, the locking key of the spring-loaded clamping mechanism also includes structure projecting from the shoulder portion for engaging the biasing member in substantial alignment with a longitudinal axis of the elongated body.

According to another aspect of the invention, each of the first and second of the locking key includes a lead-in formed between the shoulder portion and an edge of the detent distal from the body.

According to another aspect of the clamping mechanism of the invention, the clamping mechanism is a cradle for a mobile electronics device, wherein the cradle includes a substantially rigid ladle-shaped base having a seat formed therein and a back portion extending crosswise from the seat, the back portion including a channel having an opening thereinto formed at a first end that is distal from the seat and the back portion is formed having a substantially rigid but resiliently flexible wall structure that includes adjacent to the opening at least one notch formed therein; a substantially rigid clamp having a jaw and an elongated shaft extending crosswise from the jaw, the elongated shaft being structured to be slidingly received into the channel through the opening thereinto and further including a spring engagement structure formed distal from the jaw; a locking key having one or more substantially rigid detents projecting crosswise from a substantially rigid body portion, each of the one or more detents being structured to interfere with the into the channel opening and the substantially rigid but resiliently flexible wall structure of the channel portion of the base and to interlock with one of the notches formed in the channel portion of the base with a tapered lead-in formed between a first end of the body portion and a portion of the detent distal from the body portion, the locking key also having shoulder portion formed a first end of the body portion substantially crosswise to a longitudinal axis of the body portion and having formed therein structure for receiving one end of the compression spring; and a compression spring sized to be slidingly received into the channel through the opening thereinto and further sized to be in a partly compressed state when positioned between the locking key and an end of the elongated shaft of the clamp distal from the jaw.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 3, 4 and 5 each illustrate aspects of a spring loading mechanism of the invention for use with the cradle and electrical interface apparatus described herein, wherein:

FIG. 3 is a cross-sectional view of the cradle and electrical interface apparatus illustrated in FIG. 2, FIG. 4 is a close-up of the cross-sectional view shown in FIG. 3, and FIG. 5 is a close-up perspective view of the locking key portion of the locking mechanism illustrated in FIGS. 3 and 4;

FIG. 9 is a perspective view that illustrates one embodiment of the base element that is structured to cooperate with the spring-loaded clamp and the locking key elements for securely releasably cradling and electrically interfacing a pocket-sized personal computer or other mobile electronic device;

FIG. 10 is a perspective view from the back of the cradle and electrical interface apparatus according to the embodiment illustrated in FIG. 2;

DETAILED DESCRIPTION OF PREFERRED EMBODIMENT

In the Figures, like numerals indicate like elements.

The present invention is a spring-load clamping mechanism formed by a pair of resiliently flexible walls spaced apart a substantially constant distance and having an opening formed therebetween. A compression spring is sized to be compressed between the spaced apart walls. A clamp is provided having a drive portion extending from a jaw portion, the drive portion is sized to slidingly fit between the spaced apart walls and includes structure that is adapted to engage a first end of the spring, the spring engagement structure is spaced away from the jaw portion. A locking key is structured to substantially permanently interlock with one or more of the spaced apart walls and to engage a second end of the spring.

Accordingly, the locking key is formed with one or more detents that project from a body portion; and at least one of the resiliently flexible walls is formed with a notch positioned adjacent to the opening formed therebetween, the notch is structured to receive the detent of the locking key.

As discussed herein, according to one embodiment of the invention, the locking key is formed with a shoulder portion at one end for supporting the spring in a compressed state. The locking key also includes a nose portion or other structure formed at one end that extending from the shoulder portion for positioning the spring relative to the locking key.

According to one embodiment of the invention, the drive portion of the clamp includes an elongated shaft portion that cooperates with the locking key to contain the spring in a partly compressed state when the locking key is interlocked with one or more of the spaced apart walls.

The spring-load clamping mechanism of the invention is illustrated herein in use with an apparatus for securely releasably cradling and electrically interfacing a pocket-sized personal computer or other mobile electronic device that is combined in an integral apparatus that is both permanently or semi-permanently installable as a vehicle holding platform and removably attachable as by a belt to the user's person as a personal carrying apparatus.

The cradle portion of the combination cradle and electrical interface apparatus is provided by a generally open frame having a base and a clamp for securing the device in the base. The locking mechanism of the invention is integrated with the base and clamp and includes a key for securing the spring-loaded clamp to the base in an expandably contracting assembly.

Figure 2:
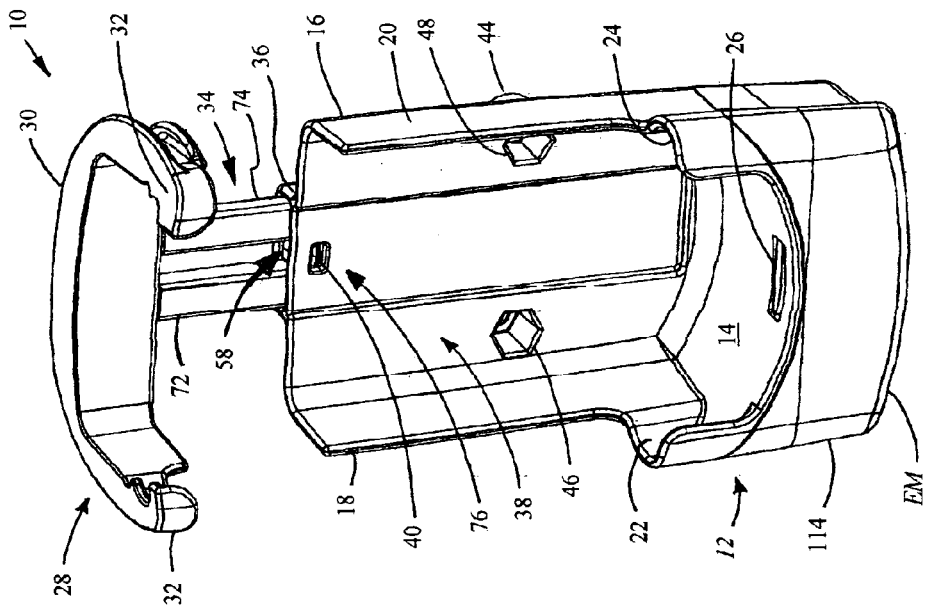
FIG. 2 illustrates a cradle and electrical interface apparatus integrated with the locking mechanism of the invention for use in combination with one of the known universal support devices such as is described in incorporated U.S. Pat. No. 5,845,885, or another support.
Figure 1:
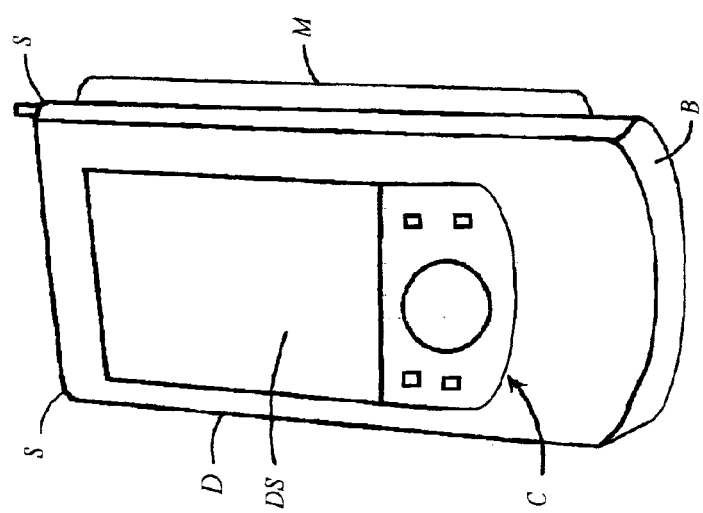
FIG. 1 illustrates a modern mobile electronic device such as a pocket-sized personal computer of a well-known type.

FIG. 2 is a perspective view that illustrates the locking mechanism of the present invention embodied in a combination cradle and electrical interface apparatus 10 having a base 12 that is structured with a socket-shaped seat 14 and a stiff, C-channel-shaped back 16 that is structured for slidingly receiving one of the generally well-known mobile electronic devices D as illustrated in FIG. 1, such as a hand-held pocket-sized personal computer, commonly referred to as a "pocket PC," or another mobile electronic device, such as a cellular telephone, a mobile global positioning system (GPS) receiver, a Personal Digital Accessory (PDA) or another mobile electronic device such as are generally well-known.

For example, the open C-channel-shaped back 16 extends from the socket-shaped seat 14 of the base 12 and is structured with spaced-apart channel-shaped side walls 18, 20 having respective contoured receptacles or "notches" 22, 24 that are structured for removably slidingly receiving a body portion B of the device D. An appropriately positioned access port 26 is provided in the socket-shaped seat 14 for providing an electrical interface to an electronics module EM, as illustrated in FIG. 3.

A spring-loaded or otherwise resiliently biased clamp 28 is slidingly engaged with the back 16 of the base 12 for contracting and expanding an open C-channel-shaped jaw 30 relative to the socket-shaped seat 14. As is more clearly illustrated in FIG. 7, the jaw 30 includes a pair of "wings" 32 for positively engaging shoulder portions S of an inserted device D opposite from the base portion B for securing the device D relative to the socket-shaped seat 14 of the base 12 when the clamp 28 is contracted relative to the seat 14. The clamp 28 includes a spring-loaded or otherwise resiliently biased drive portion 34 that operates in concert with other portions of the apparatus 10 to resiliently contract the jaw 30 relative to the seat 14 of the base 12. According to one embodiment of the invention, drive portion 34 is embodied as an elongated shaft portion of the clamp 28 that extends longitudinally from the jaw 30 and is structured to slidingly engage a tube or closed-surface channel 36 that forms a rigid spine along a center section 38 of the back 16 of base 12.

Figure 5:
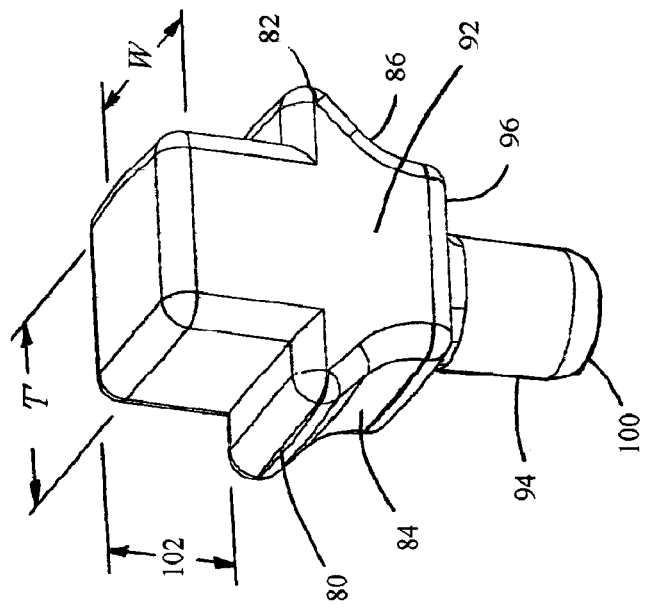

A locking key 40 of the invention, which is more clearly illustrated in FIGS. 3, 4 and 5, interlocks the elongated shaft portion 34 of the clamp 28 with the base 12 and limits relative motion therebetween. As is more clearly illustrated in FIGS. 3, 4 and 5, the locking key 40 is structured to provide a positive stop relative to the base 12 against which the spring-loaded clamp 28 operates for contracting the jaw 30 toward the base seat 14.

In operation, the device D is loaded into the apparatus 10 of the invention by first retracting the clamp 28 relative to the base 12 against the compressed spring pressure provided by the spring-loaded clamp 28. When the clamp 28 is sufficiently expanded relative to the base 12, the device D is seated between the notches 22, 24 in the base 12 and bottomed against the seat 14. The device D is electrically interfaced by means of mating an electrical connector in the bottom of the device D with a complementary electrical connector 42 mounted through the access port 26. The spring pressure of the locking mechanism is thereafter permitted to expand and thereby contract the clamp 28 relative to the base 12. The spring-loaded clamp 28 thereby securely releasably cradles the device D between the clamp's jaw 30 and the seat 14.

As is generally well-known, pocket PCs and other mobile electronic devices D of the type illustrated in FIG. 1 and intended to be supported by the combination cradle and electrical interface apparatus 10 of the invention typically include operational controls C and an information viewing or display screen DS both located on one face. Aspects of the apparatus 10 of the invention are therefore structured to expose the facial operational controls C and display screen DS to the user. For example, according to the embodiment illustrated herein the notches 22, 24 in the base 12 and the wings 32 of the jaw 30 are respectively contoured to expose the facial operational controls C and display screen DS of the installed device D for manipulation and viewing by the user.

The combination cradle and electrical interface apparatus 10 is either permanently or semi-permanently installable as a vehicle support platform and removably attachable as by a belt to the user's person as a personal carrying apparatus. For example, the apparatus 10 includes an integral support interface or connector 44, which is more clearly illustrated in one or more subsequent figures, for mounting to a support structure, such as the ball-and-socket support structure disclosed in U.S. Pat. No. 5,845,885, UNIVERSALLY POSITIONABLE MOUNTING DEVICE, issued to the inventor of the present invention on Dec. 8, 1998, which is incorporated in its entirety herein by reference. The support connector 44 is operated, for example, by fasteners (not shown) passed through clearance holes 46, 48 in the back 16 of the base 12. The clearance holes 46, 48 may be counter-bored to accept the fasteners. When the fasteners are configured with square or hex-shaped heads, the clearance holes 46, 48 may be counter-bored with a matching square or hex shape (shown) for securing the fasteners against rotation while mating nuts (not shown) are installed to secure the apparatus 10 to the support structure.

FIG. 3 is a cross-sectional view of the apparatus 10 as illustrated in FIG. 2. The cross-sectional view illustrates one embodiment of the locking mechanism of the invention. For example, FIG. 3 illustrates the assembly of the expandably contractible spring-loaded clamp 28, base 12 and locking mechanism of the invention embodied as the cradle portion of the invention for securely cradling and electrically interfacing a pocket PC or other mobile electronic device in releasable manner. The locking mechanism of the invention is embodied in FIG. 3 as the locking key 40 integrated with the clamp 28 and base 12.

As discussed above, the tube or closed-surface channel 36 forms the spine of the center portion 38 of the base back 16. As embodied in the example of FIG. 3, the closed-surface of channel 36 is formed in part by an interior channel wall 50 that extends, by example and without limitation, substantially the entire length of the center portion 38 of the base back 16. The interior channel wall 50 is matched by an opposing exterior channel wall 52 that is coupled to the interior wall 50 in a spaced-apart manner by a pair of spaced-apart opposing channel walls 54, 56 intervening therebetween. At least the interior, exterior, and intervening walls 50, 52, 54, 56 that form the closed-surface of channel 36, and optionally the entire structure of the base 12, are formed of a substantially rigid and resilient material, such as a rigid metal or plastic, such that the closed-surface of channel 36 operates as a stiffener to rigidify the back portion 16 of the base 12. The interior channel wall 50 is optionally offset relative to the center portion 38 of the back portion 16, which will be well-understood by those of ordinary skill in the mechanical arts to add further stiffening to the base back portion 16.

The closed-surface channel 36 includes an open space or opening 58 between the closed surface formed by the interior, exterior, and intervening walls 50, 52, 54, 56. The opening 58 extends from a first end 60 opposite from the base seat 14 for substantially the entire length of the base back portion 16 and thereby forms an open space within the interior of the closed-surface channel 36. The extended opening 58 is sized to admit the elongated shaft 34 portion of the clamp 28 in sliding engagement for substantially the entire length of the closed-surface channel 36. Optionally, as embodied in the figures, the opening 58 extends the entire length of the closed-surface channel 36 such that it is open on both first end 60 and a second opposite end 62 adjacent to the seat 14 and has a substantially constant cross-sectional interior configuration for its entire length. Although possibly more difficult to manufacture, the channel 36 is optionally closed at its second end 62.

A resiliently compressible biasing member or spring 64, illustrated by example and without limitation as a conventional coil-type steel compression spring, is inserted between a first near end 66 of the elongated shaft 34 adjacent to the jaw 30 and a second end 68 distal from the jaw 30. The second distal end 68 of the elongated shaft 34 is structured to engage and capture one end 70 of the biasing spring 64. For ease of assembly, the distal end 68 of the elongated shaft 34 optionally includes a tab or nib 72 structured to engage and capture the end 70 of the biasing spring 64.

After this assembly with biasing spring 64, the elongated shaft 34 is inserted into the closed-surface channel 36. The second end 68 of the elongated rod 34 is inserted through the opening 58 in the channel's first end 60 and slid toward the second end 62 of the channel 36. The elongated shaft 34 is thereby slidingly engaged with the channel 36 formed between its interior, exterior, and intervening walls 50, 52, 54, 56.

The biasing spring 64 is additionally compressed against the second distal end 68 of the clamp's elongated shaft 34 by pressure exerted against the biasing spring's free end 74. With the biasing spring 64 in a generally expanded condition having its free end 74 compressed against the distal end 68 of the elongated rod 34 and captured within the closed-surface channel 36, the locking key 40 is installed between the free end 74 of the biasing spring 64 and the jaw 30 of the clamp 28, and is mechanically coupled to the channel 38 at its first end 60 near the opening 58. The biasing spring 64 is thereafter expandably compressed between the locking key 40 and distal end 68 of the clamp's elongated shaft 34. The biasing spring 64 thereafter exerts an expanding spring force, illustrated by the arrow S, between the locking key 40 and the distal end 68 of the elongated rod 34 that results in a force that contracts or biases the jaw 30 toward the seat 14 of the base 12, as illustrated by the arrow F. The biasing spring 64 thereby operates to expandably biases the clamp's jaw 30 toward the seat 14 of the base 12 for securing an inserted device D therebetween. The biasing spring 64 is selected having a spring rate sufficient to cause the clamp 28 to securely cradle the inserted device D against the seat 14 of the base 12.

According to the embodiment of the invention as illustrated in FIG. 3 and more clearly illustrated in the close-up view of FIG. 4, at least one, and optionally both (shown), of the interior and exterior channel walls 50, 52 are formed with respective opposing notches 76, 78 adjacent to the channel opening 58. The notch or notches 76, 78 are structured to engage mating detents 80, 82 on the locking key 40, whereby the locking key 40 is fixed in locked relationship with the channel 36 portion of the base 12. Thereafter, the closed-surface channel 36 and the locking key 40 together operate as a catch for the biasing member or compression spring 64 that spring-loads or "biases" the expandable clamp 28 toward the base's seat 14 in a retractable or expandable manner. For ease of manufacturing the notches 76, 78 are apertures formed completely through the respective channel walls 48, 50 (shown). The notches 76, 78 are optionally closed indentations formed on opposing interior surfaces of the channel walls 50, 52. The detents 80, 82 engage the opposing notches 76, 78 to fix the locking key 40 in locked relationship with the base 12 and to capture the compression spring 64 between the distal end 68 of the clamp's elongated shaft 34 and the first end 60 of the channel 36 distal from the base's seat 14.

The locking key is formed of a substantially incompressible material, for example metal or hard plastic, so that the detents 80, 82 are stiff and unyielding. As discussed herein, the closed-surface of channel 36 is formed of a substantially rigid material, such as a metal or rigid plastic. The interior and exterior walls 50, 52 of the channel 36 are constructed having a width and thickness calculated to cooperate with the locking key 40 such that one or both of the channel walls 50, 52 flex slightly to admit the locking key 40 therebetween when sufficient pressure is applied to force locking key 40 through the channel opening 58. According to one embodiment of the invention, the detents 80, 82 of the locking key 40 are each formed with a respective lead-in 84, 86 for easing entry of the locking key 40 into the channel opening 58. The lead-ins 84, 86 are, for example, a bevel or chamfer or a fillet (shown). The channel opening 58 may include lead-ins 88, 90 that further ease entry of the locking key 40.

The locking key 40 includes a body 92 that is shaped to cooperate with the interior of the channel 36 and is sized to fit through the opening 58 and thereafter become fixed in locked relationship with the notches 76, 78 and thereby block the opening. For example, the key body 92 is substantially rectangular in cross-section when the channel 36 is formed with a rectangular cross-section. Optionally, the locking key 40 includes an integral tab or "nose" portion 94 that is structured to engage and capture the free end 74 of the biasing spring 64. In order to engage the biasing spring 64, the nose 94 is formed smaller than the key body 92 so that a shoulder 96 is formed at the intersection. The shoulder 96 provides a rest or stop for supporting the biasing spring 64 in a partly compressed state when the biasing spring 64 is a conventional compression spring wound in a tubular shape along its active longitudinal axis. Thus, the nose 94 is sized to fit inside the tubular spring 64, while the shoulder 96 is sized larger than the outer diameter of the tubular biasing spring 64. The nose portion 96 thereby provides purchase on the locking key body 92 during assembly that helps to maintain the relative positioning and alignment of the biasing spring 64 with the locking key body 92. Optionally, the nose 94 includes means for securing the biasing spring 64 relative to the locking key 40. For example, the nose 94 is formed with a cross-axis dimension, such as a diameter, sized to be a slight interference fit within the tubular coil-type biasing spring 64.

During assembly the key's nose 94 is fitted into the previously free end 74 of the tubular biasing spring 64. The locking key 40 is then pressed through the channel opening 58 and between the walls 50, 52. The key's lead-ins 84, 86 and channel opening lead-ins 88, 90 are used to ease entry of the locking key 40. The channel walls 50, 52 resiliently flex and spread apart to admit the key's detents 80, 82 that extend from the key's body 92. The channel walls 50, 52 continue to flex and spread apart as the key 40 travels along the channel 36. The key's body 92 and nose 94 are further structured to cooperate with the channel walls 50, 52 and the biasing spring 64, respectively, to maintain alignment of the key 40 with the channel 36. When the key 40 is pushed far enough into the channel 36, the key's detents 80, 82 encounter and enter the notches 76, 78 in the channel walls 50, 52. Upon entry of the detents 80, 82 into the cooperating notches 76, 78 the substantially rigid and resiliently flexible interior and exterior channel walls 50, 52 resiliently revert or "snap back" to their natural shape, whereby the key's detents 80, 82 are nested and substantially permanently captured in the cooperating notches 76, 78. The biasing spring 64 is thereby permanently captured within the channel 36 between the distal end 68 of the clamp's elongated shaft 34 and the first end 60 of the channel 36 distal from the base's seat 14.

According to one embodiment of the invention, the key body 92 optionally includes means for easing ejection from a mold, when the key 40 is manufactured by injection molding plastic, or means for controlling the key 40 during assembly. For example, the key body 92 is hollowed by a aperture 98 therethrough either for a mold ejection pin, or an assembly guide pin or other control device.

FIG. 5 is a perspective view of one embodiment of the locking key 40 wherein the body 92 is embodied as a substantially solid and unbroken block of rigid and unyielding material. The block-shaped body 92 is configured having a thickness T in the area of the shoulder 96 that is sized to be slidingly received between the interior and exterior walls 50, 52 of the channel 36. The bullet-shaped nose 94 projects from the shoulder area 96 and ends in a beveled or rounded (shown) tip 100 that eases engagement with the tubular biasing spring 64. The key's lead-ins 84, 86 gently slope away from the body's shoulder area 96 outward to the form the detents 80, 82. The two detents 80, 82 thus extend outwardly from the body's walls and increase the body's thickness T to greater than the spacing between the walls 50, 52, which permits them to engage and nest in the channel notches 76, 78.

The locking key body 92 is optionally extended beyond the detents 80, 82 distal of the shoulder 96. An extended body area 102 increases the surface contact area between the locking key 40 and the channel walls 50, 52, which reduces or eliminates any tendency for the key body 92 to twist or rotate during or after insertion into the channel 36. The width W of the body 92 is selected in consideration of the attributes of the elongated shaft 34 portion of the clamp 28 in combination with attributes of the channel 36. The body width W is thus selected to cooperate with the elongated shaft 34 and the channel walls 54, 56, which provide spacing between the walls 50, 52, to reduce or eliminate any tendency for the key body 92 to twist or rotate during or after insertion into the channel 36.

Figure 6:
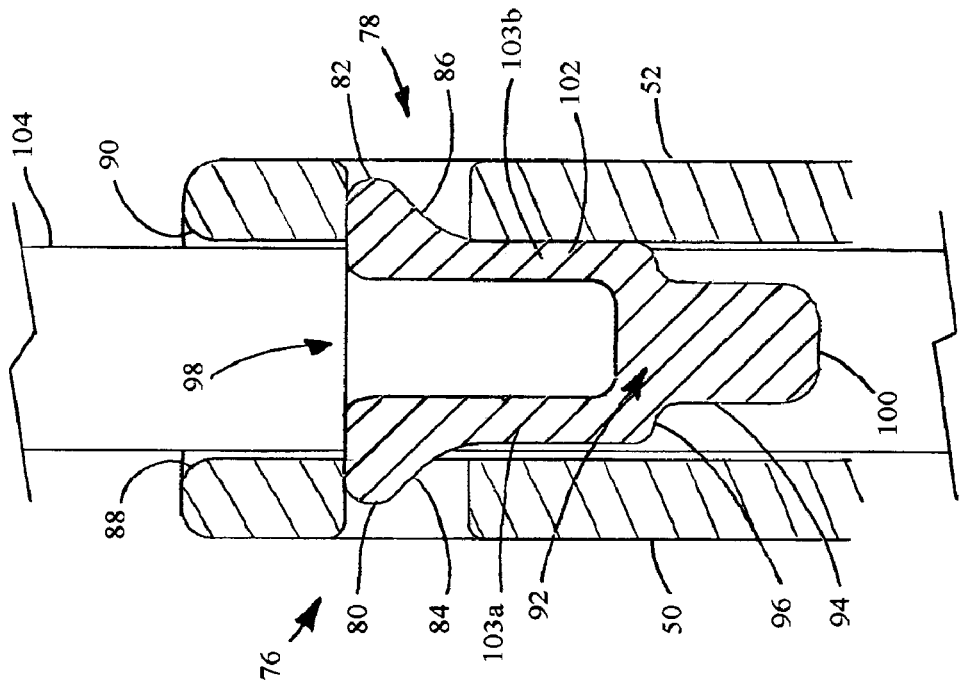
FIG. 6 illustrates one exemplary alternative embodiment of the locking key of the invention.

FIG. 6 illustrates one exemplary alternative embodiment of the locking key 40 of the invention wherein the body portion 92 is elongated relative to the exemplary embodiment illustrated in FIGS. 3, 4 and 5. Additionally, the detents 80, 82 are spaced-away from the shoulder portion 96, and the aperture 98 is elongated and opened on one end so as to form an open space between a pair of fingers 103a, 103b that contain the detents 80, 82. The extended body area 102 is provided between the shoulder portion 96 and the detents 80, 82 for increasing the surface contact area between the locking key 40 and the channel walls 50, 52 to reduce or eliminate any tendency for the key body 92 to twist or rotate during or after insertion into the channel 36. The exemplary alternative embodiment of the locking key 40 permits the detents 80, 82 to flex inwardly toward one another during assembly with the base 12 such that the body 92 of the locking key 40 flexes to fit between the walls 50, 52 of the channel 36, rather than the walls 50, 52 flexing to accommodate the detents 80, 82, as illustrated in FIGS. 3, 4 and 5. Upon encountering the notches 76, 78, the fingers 103a, 103b resiliently expand or "snap back" to their natural shape to engage the detents 80, 82 with the notches 76, 78 and nest the detents 80, 82 therein, thereby interlocking the key 40 with the channel 36 for permanently capturing the biasing spring 64 within the channel 36 between the distal end 68 of the clamp's elongated shaft 34 and the first end 60 of the channel 36 distal from the base's seat 14.

Figure 7:
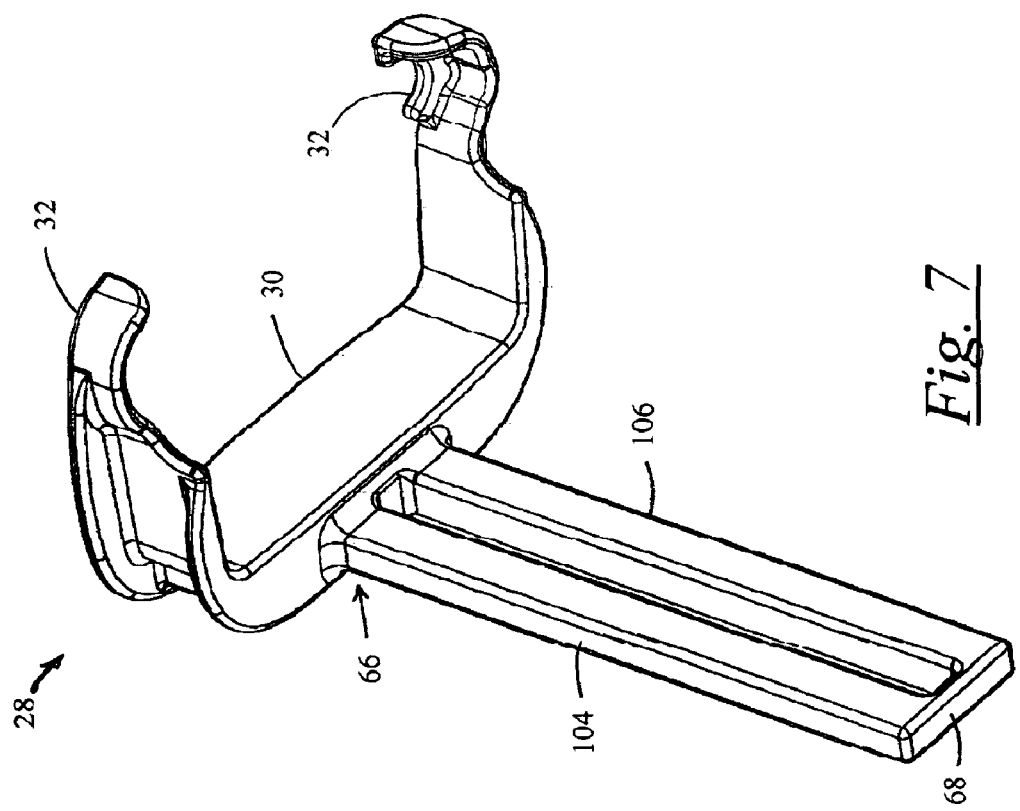
FIG. 7 illustrates a clamp mechanism useful in combination with the locking mechanism of the invention and a base portion of the cradle and electrical interface apparatus illustrated in FIG. 2.

FIG. 7 illustrates one embodiment of the clamp 28 as configured to cooperate with the body 12 and locking key 40 to provide the combination cradle and electrical interface apparatus 10 of the invention. According to one embodiment of the invention, the elongated shaft 34 is formed of two spaced-apart elongate rods or shafts 104, 106 extended crosswise from the jaw 30 along the longitudinal axis of the jaw's C-channel shape. The two spaced-apart rods 104, 106 are joined together at the second end 68 of the elongated shaft 34 distal from the jaw 30. According to one embodiment, the second end 68 of the elongated shaft 34 is embodied as a bridge member integrally formed between the ends of the two spaced-apart rods 104, 106 distal from the jaw 30.

The biasing spring 64 is selected in width to fit between the spaced-apart rods 104, 106 and is selected in length to fit between the first end 66 adjacent to the jaw 30 of the clamp 28 and the second end 68 closed by the distal bridge member. The biasing spring 64 is optionally selected having a length that must be slightly compressed to fit between the first near and second distal ends 66, 68 of the elongated shaft 34.

Figure 8:
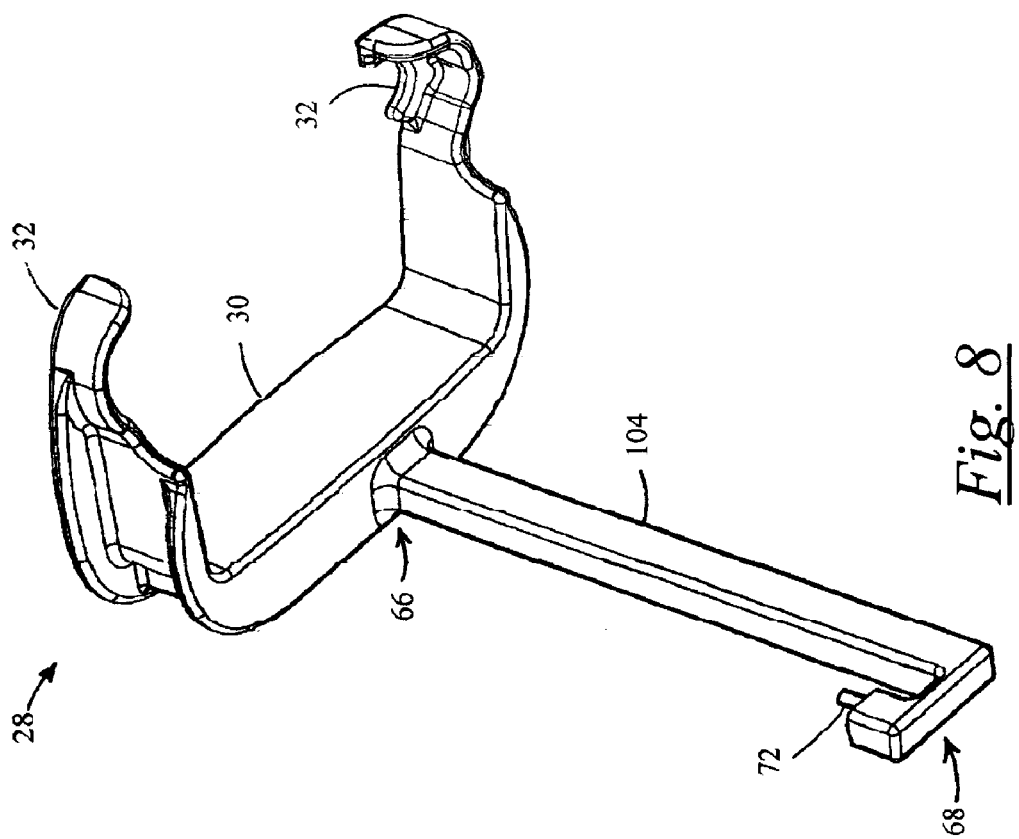
FIG. 8 illustrates an alternative embodiment of the elongated shaft portion of the clamp element having an elongated L-shape or J-shape.

FIG. 8 illustrates an alternative embodiment of the elongated shaft having an elongated L-shaped or J-shaped member formed of a single elongated rod 104 with a out-jutting tail formed by the second end 68 distal from the jaw 30 wherein the tail is structured to secure the end of the biasing spring 64. The tail end 68 optionally includes the tab or nib 72 for engaging and capturing the end 70 of the biasing spring 64.

FIG. 9 is a perspective view that illustrates one embodiment of the base 12 that is structured to cooperate with the spring-loaded clamp 28 and the locking key 40 for securely releasably cradling and electrically interfacing a pocket-sized personal computer or other mobile electronic device in the integral apparatus 10. FIG. 9 illustrates the channel 36 as forming the stiff spine of the center portion 38 of the base's back portion 16. As embodied in the example of FIG. 9, the closed channel 36 is formed of the interior channel wall 50 that extends, by example and without limitation, substantially the entire length of the center portion 38 of the base back 16. The interior channel wall 50 is matched by the opposing exterior channel wall 52 that is coupled to the interior wall 50 in a spaced-apart manner by the pair of spaced-apart opposing channel side walls 54, 56 intervening therebetween. One or both (shown), of the interior and exterior channel walls 50, 52 are formed with the opposing notches 76, 78 for engaging the detents 82, 84 of the locking key 40, whereby the closed channel 36 and the locking key 40 cooperate as the catch for the biasing spring 64 that loads the clamp 28 as discussed herein. The channel opening 58 that accepts the clamp 28 is optionally formed either on the inside wall or on the outside wall (shown) of the channel-shaped back portion 16 that, together with the base seat 14, forms the cradle portion of the apparatus 10.

The interior cross-sectional configuration of the closed-surface channel 36 is by example and without limitation formed with a generally rectangular shape. However, the closed-surface channel 36 is optionally formed having a generally square, round, oval or irregular interior cross-sectional configuration. The shape of the interior cross-sectional configuration of the closed-surface channel 36 is not important to the invention. Rather, the cross-sectional shapes of the elongated shaft 34 and the channel 36 need only be matched to cooperate in sliding engagement with sufficient space remaining to accommodate the biasing spring 64, as described herein.

Furthermore, when the cooperating cross-sectional configurations of the elongated shaft 34 and channel 36 differ from the generally rectangular configurations illustrated by the exemplary embodiment depicted herein, the locking key 40 is embodied having a configuration that is reasonably expected to cooperate with the elongated shaft 34 and channel 36 elements according to the invention described herein.

According to one embodiment of the invention, the opposing side walls 18, 20 of the channel-shaped back portion 16 are formed with the respective contoured notches 22, 24 for slidingly receiving the base portion B of a generally well-known mobile electronic devices D. The contoured receptacles or notches 22, 24 are formed with respective seats 108, 110 that are more widely spaced apart than the side walls 18, 20. The seats 108, 110 of the notches 22, 24 wrap partially around a front or "insertion" face of the base 12, whereby the base portion B of the device D can be removably slidingly received between the side walls 18, 20 within the receptacles or notches 22, 24.

The notches 22, 24 are optionally offset away from the center portion 38 of the back portion 16 so that, when inserted therein, the body B of the device D remains spaced-away from the deeper center portion 38 of the back 16. The base 12 thereby provides additional depth of space for thicker devices, such as a pocket PC having an extra memory module M mounted piggy-backed thereon, as illustrated in FIG. 1. The notches 22, 24 also operate to position the device D relative to the access port 26 that is provided in the socket-shaped seat 14 for the electrical connector 42 that provides electrical interface to the electronics module EM, as illustrated in FIG. 3.

A means for mounting the electronics module EM is provided opposite from the interior of the device seat 14, for example, as a quantity of supports 112 that project from the exterior surface of the device seat 14. Each of the supports 112 is structured to support one or more electrical circuits EC of the electronics module EM, the input/output (I/O) connector 42, or a cover 114 for protecting the sensitive electrical circuits EC, as illustrated in FIG. 3.

FIG. 10 is a perspective view of the cradle and electrical interface apparatus 10 from the back. According to the embodiment illustrated in FIG. 10, the tube or channel 36 on the outside of the back portion 16 of the base member 12 is a substantially rectangular tube or channel having a substantially continuous generally rectangular cross-section. The channel's length, width and depth dimensions are optionally increased or decreased independently or in different combinations in cooperation with length, width and depth dimensions of different elongated shaft portions 34 of the spring-loaded clamp 28. The channel 36 also operates to stiffen the back portion 16 of the base 12 so that wall thickness can be minimized while structural integrity is maintained.

FIG. 10 best illustrates that an exterior surface of the base 12 is structured with the integral support interface or connector structure 44 for interchangeably attaching the apparatus 10 to a support structure, such as a to a belt clip, a ball-and-socket mounting device of the type disclosed in U.S. Pat. No. 5,845,885, which is incorporated by reference herein, or another attachment configured either to permanently or semi-permanently install the apparatus 10 on a vehicle or other surface, and to removably attach the apparatus 10 to a user's person, as by attachment to a belt looped about the waist.

For example, according to one embodiment of the invention, the connector structure 44 is embodied by example and without limitation as the pair of spaced-apart fastener clearance holes 46, 48 positioned in the back 16 of the base 12. The pair of spaced-apart fastener clearance holes 46, 48 are structured for coupling the apparatus 10 to a belt clip, a ball-and-socket mounting device, or another support structure. While the connector structure 44 is illustrated by example as one pair of spaced-apart fastener clearance holes 46, 48, the connector structure 44 is not so limited as the exemplary embodiment depicted. Rather, the connector structure 44 may be embodied as having more or less fastener clearance holes. The fastener clearance holes 46, 48 are optionally threaded for a threaded fastener, or are constructed with a smooth bore as clearance holes for threaded or other fasteners. According to one embodiment of the invention, the connector structure 44 includes a pair of pedestals or bosses 116, 118 integrally formed on the exterior surface of the back portion 16 of the base 12 with the bosses 116, 118 containing the pair of spaced-apart fastener clearance holes 46, 48, respectively.

The bosses 116, 118 are optionally joined to the exterior of the spinal channel 36 by a first and second pairs of stiffeners 120, 122 of the connector structure 44 that project from the exterior surface of the upright tubular body 102 between the bosses 116, 118 containing the pair of spaced-apart fastener clearance holes 46, 48. The pairs of stiffeners 120, 122 are formed integrally with the exterior surfaces of both the back portion 16 of the base 12 and the spinal channel 36 as well as with the bosses 116, 118 containing the pair of spaced-apart fastener clearance holes 46, 48. The pairs of stiffeners 120, 122 are optionally structured in an diamond pattern (shown) or other shape desirable for conforming to a mounting interface of a belt clip, a ball-and-socket mounting device, or another support of choice.

Figure 11:
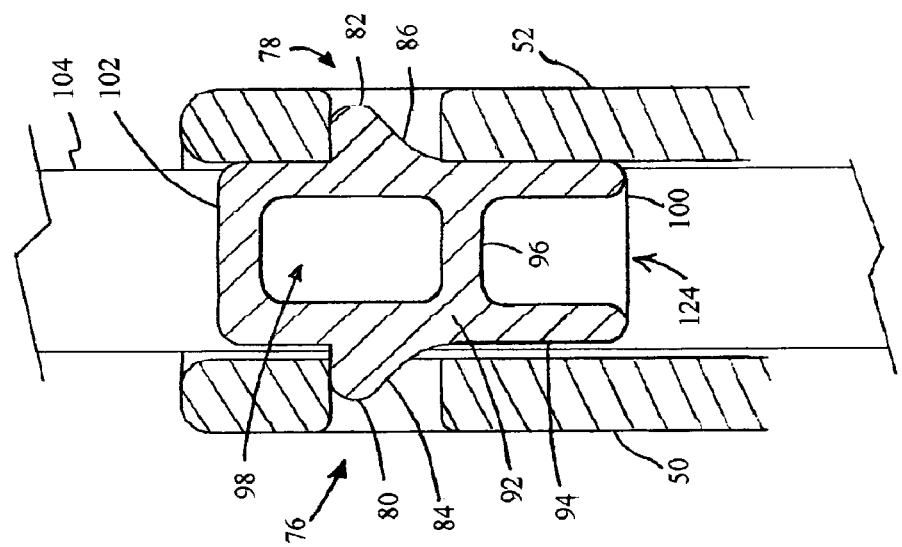
FIG. 11 illustrates one alternative embodiment of the locking mechanism of the invention wherein the locking key is structured to receive the biasing spring into a concave depression or recess formed therein.

FIG. 11 illustrates one alternative embodiment of the locking mechanism of the invention wherein the locking key 40 is structured to receive the biasing spring 64 into a concave depression or recess. For example, the shoulder portion 96 of the key 40 for supporting the biasing spring 64 in a partly compressed state is formed at the bottom of a depression or recess 124 formed in the surface of the key body 92 in place of the nose portion 94. The recess 124 is sized to accept the tubular shape of the coil-type compression spring 64 and is optionally dimensioned to be a slight interference fit therewith so that the biasing spring 64 is substantially interlocked with the key 40 after assembly into the recess 124.

According to different alternative embodiments of the locking mechanism of the invention, the locking key 40 and channel 36 interlock in a reverse configuration wherein the notches 76, 78 are formed in the walls of the body 92 portion of the key 40, and the detents 80, 82 are formed as protrusions jutting inwardly of the channel 36 from the opposing interior walls 50, 52 in such manner as to interlock with the notches 76, 78 in the locking key's body 92.

Figure 12:
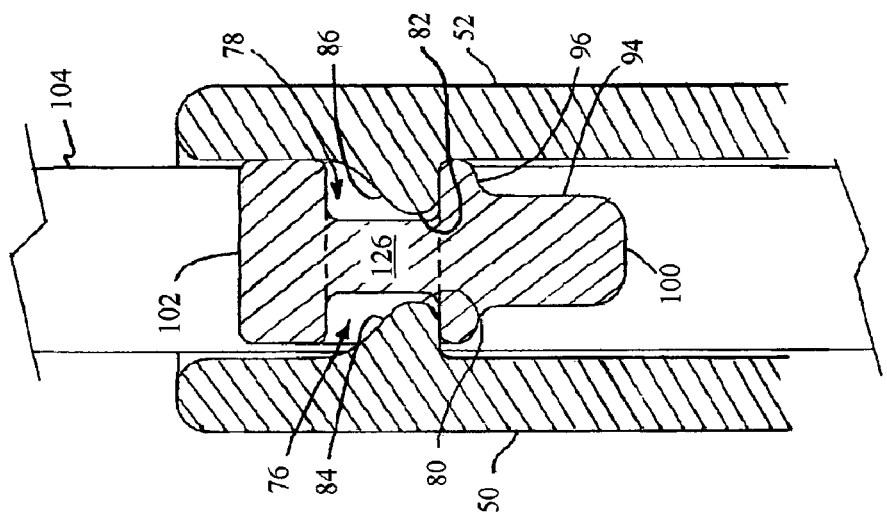
FIG. 12 illustrates one of the alternative embodiments of the locking mechanism wherein the locking key and channel interlock in a reverse configuration relative to the embodiments illustrated in FIGS. 1 through 10.

FIG. 12 illustrates one of the alternative embodiments of the locking mechanism wherein the locking key 40 and channel 36 interlock in a reverse configuration. For example, the locking key 40 is formed with either the pair of notches 76, 78 (shown) or an optional single notch 126 (shown in phantom) that is formed as an aperture that passes through the body portion 92 adjacent to the shoulder area 96, and is further formed having the extended body area 102 formed distal of the shoulder 96 past the notch 126 or notches 76, 78 for increasing the surface contact area between the locking key 40 and the channel walls 50, 52, to counteract any tendency for the key body 92 to twist or rotate during or after insertion into the channel 36. The channel walls 50, 52 are formed with the complementary detents 80, 82. The channel walls 50, 52 are designed to flex slightly when forced apart by entry of the locking key 40 therebetween and to resiliently revert or "snap back" to their natural shape, whereby the channel detents 80, 82 are nested and substantially permanently captured in the cooperating notch 126 or notches 76, 78.

Figure 13:
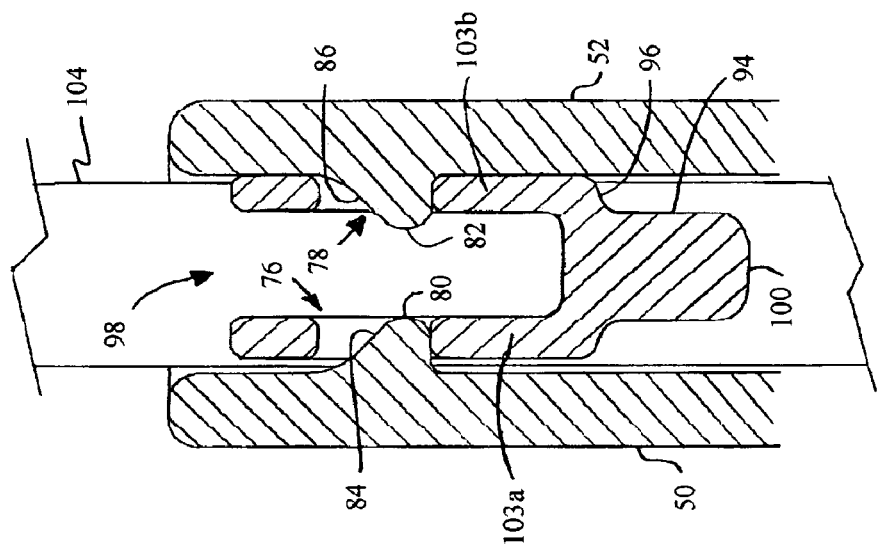
FIG. 13 illustrates another alternative embodiment of the locking mechanism wherein the locking key and channel interlock in a reverse configuration.

FIG. 13 illustrates one of the alternative embodiments of the locking mechanism wherein the locking key 40 and channel 36 interlock in a reverse configuration. For example, the locking key 40 is formed with the notches 76, 78 spaced-away from the shoulder portion 96, and the aperture 98 is elongated and opened on one end so as to form an open space between the pair of fingers 103a, 103b that contain the notches 76, 78. The exemplary alternative embodiment of the locking key 40 permits the fingers 103a, 103b containing the notches 76, 78 to flex inwardly toward one another during assembly with the base 12 such that the body 92 of the locking key 40 flexes to fit between the detents 80, 82 that are formed in the walls 50, 52 of the channel 36, rather than the walls 50, 52 flexing to accommodate the detents 80, 82, as illustrated in FIGS. 3, 4 and 5. When the encountering the notches 76, 78, the fingers 103a, 103b resiliently expand or "snap back" to their natural shape to engage the notches 76, 78 with the detents 80, 82 that nest therein, thereby interlocking the key 40 with the channel 36 for permanently capturing the biasing spring 64 within the channel 36 between the distal end 68 of the clamp's elongated shaft 34 and the first end 60 of the channel 36 distal from the base's seat 14.

While the preferred embodiment of the invention has been illustrated and described, it will be appreciated that various changes can be made therein without departing from the spirit and scope of the invention. For example, the rectangular elongated shaft portion 34 of the clamp 28 is optionally rotated about its longitudinal axis relative to the jaw portion 30, while the mating channel portion 36 of the base 12 is similarly rotated in cooperating manner, without departing from the spirit and scope of the invention. Therefore, the inventor makes the following claims.

What is claimed is:

1. A secure clamping mechanism comprising:
   two spaced apart surfaces;
   a resiliently compressible biasing member between the two spaced apart surfaces;
   a clamp portion having a drive portion that is structured to be slidingly engaged between the two spaced apart surfaces;
   a locking key engaging the biasing member between the drive portion and at least one of the spaced apart surfaces, the locking key interlocked with at least one of the two spaced apart surfaces; and
   one of the locking key and one of the spaced apart surfaces resiliently flexes to permit the locking key to be positioned between the two spaced apart surfaces and further relaxes for interlocking the locking key between the two spaced apart surfaces after the locking key is positioned.

2. The mechanism of claim 1 wherein the locking key further comprises an integral detent structured to engage a notch formed in one of the two spaced apart surfaces.

3. The mechanism of claim 2 wherein the locking key further comprises a pair of integral detents each structured to engage a notch formed in one of the two spaced apart surfaces.

4. The mechanism of claim 3 wherein the locking key further comprises a shoulder portion formed at a first end thereof, and a lead-in formed between the shoulder portion and a distal surface of each detent.

5. The mechanism of claim 4 wherein the shoulder portion of the locking key further comprises an elongated body portion structured with the pair of integral detents.

6. The mechanism of claim 4 wherein the shoulder portion of the locking key further comprises a tab that is structured for engaging the biasing member.

7. A secure clamping mechanism comprising:
   two spaced apart surfaces;
   a resiliently compressible biasing member between the two spaced apart surfaces;
   a clamp portion having a drive portion that is structured to be slidingly engaged between the two spaced apart surfaces; and
   a notch formed in at least one of the two spaced apart surfaces;
   a locking key engaging the biasing member between the drive portion and at least one of the spaced apart surfaces, the locking key having a complementary detent engaged with the notch; and
   one of the locking key and one of the spaced apart surfaces resiliently flexes to permit the locking key to be positioned between the two spaced apart surfaces and further relaxes for interlocking the locking key between the two spaced apart surfaces after the locking key is positioned.

8. The clamping mechanism of claim 7 wherein the drive portion further comprises an elongated shaft portion that is structured to slidingly fit between the two spaced apart surfaces and that is further structured for engaging a first end of the biasing member.

9. The clamping mechanism of claim 8 wherein the locking key further comprises a means for engaging a second end of the biasing member opposite from the first end thereof.

10. The clamping mechanism of claim 8 wherein:
    the clamp portion further comprises a jaw portion; and
    the elongated shaft portion further comprises a shaft extended from the jaw portion, wherein a portion of the elongated shaft portion distal from the jaw portion is structured for engaging the first end of the biasing member.

11. A secure clamping mechanism comprising:
    two spaced apart surfaces;
    a resiliently compressible biasing member between the two spaced apart surfaces;
    a clamp portion having a drive portion having an elongated shaft portion that is structured to be slidingly engaged between the two spaced apart surfaces and that is further structured for engaging a first end of the biasing member; and
    a notch formed in at least one of the two spaced apart surfaces;
    a locking key engaging the biasing member between the drive portion and at least one of the spaced apart surfaces, the locking key having a substantially rigid elongated body having a substantially rectangular cross-section; a substantially rectangular shoulder portion formed at a first end of the elongated body; and first and second complementary detents projecting from opposing sides of the elongated body and engaged with the notch.

12. The clamping mechanism of claim 11 wherein the locking key further comprises structure projecting from the shoulder portion for engaging the biasing member in substantial alignment with a longitudinal axis of the elongated body.

13. The clamping mechanism of claim 11 wherein each of the first and second detents further comprises a lead-in formed between the shoulder portion and an edge of the detent distal from the body.

14. A clamping mechanism comprising:
   a pair of resiliently flexible walls spaced apart a substantially constant distance and having an opening formed therebetween;
   a compression spring sized to compress between the spaced apart walls;
   a clamp having a jaw portion and a drive portion extending therefrom, the drive portion being sized to slidingly fit between the spaced apart walls and including structure that is spaced away from the jaw portion and is adapted to engage a first end of the spring; and
   a locking key structured to substantially permanently interlock with one or more of the spaced apart walls and to engage a second end of the spring, the locking key having one or more detents projecting from a body portion thereof; and
   wherein one or more of the resiliently flexible walls further comprises a notch positioned adjacent to the opening formed therebetween and structured to receive one of the detents of the locking key.

15. The clamping mechanism of claim 14 wherein the drive portion of the clamp further comprises an elongated shaft portion that cooperates with the locking key to contain the spring in a partly compressed state when the locking key is interlocked with one or more of the spaced apart walls.

16. The clamping mechanism of claim 15 wherein the locking key further comprises a shoulder portion formed at one end for supporting the spring in a compressed state.

17. The clamping mechanism of claim 16 wherein the locking key further comprises a nose portion formed at one end and extending from the shoulder portion for positioning the spring relative to the locking key.

18. A cradle for a mobile electronics device, the cradle comprising:
   a substantially rigid base having a seat formed therein and a back extending crosswise from the seat, the back including a channel having an opening thereinto formed at a first end that is distal from the seat and that is formed having a substantially rigid but resiliently flexible wall structure that includes at least one notch formed therein adjacent to the opening;
   a substantially rigid clamp having a jaw and an elongated shaft extending crosswise from the jaw, the elongated shaft being structured to be slidingly received into the channel through the opening thereinto and further including a spring engagement structure formed distal from the jaw;
   a locking key having at least one substantially rigid detent projecting from a substantially rigid body portion, the detent being structured to interlock with the notch formed in the channel portion of the base; and
   a compression spring that is sized to be received into the channel through the opening thereinto and is further sized to be in a partly compressed state when positioned between the locking key and the spring engagement structure of the elongated shaft distal from the jaw.

19. The cradle of claim 18 wherein the detent of the locking key is further structured to interfere with the channel opening and the substantially rigid but resiliently flexible wall structure of the channel portion of the base.

20. The cradle of claim 18 wherein the locking key further comprises a pair of rigid detents projecting from the substantially rigid body portion.

21. The cradle of claim 18 wherein the locking key further comprises a tapered lead-in formed between a first end of the body portion and a portion of the detent distal from the body portion.

22. The cradle of claim 18 wherein the locking key further comprises a shoulder portion formed a first end of the body portion and substantially crosswise to a longitudinal axis of the body portion.

23. The cradle of claim 22 wherein the shoulder portion of the locking key further comprises structure for receiving one end of the compression spring.

* * * * *